(12) United States Patent
Choi et al.

(10) Patent No.: US 10,411,519 B2
(45) Date of Patent: Sep. 10, 2019

(54) ENERGY TRANSMITTING METHOD AND APPARATUS, ENERGY RECEIVING METHOD, AND RECEIVING NODE

(71) Applicant: Research & Business Foundation Sungkyunkwan University, Suwon-si (KR)

(72) Inventors: Kae Won Choi, Seoul (KR); Dong In Kim, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/217,146

(22) Filed: Dec. 12, 2018

(65) Prior Publication Data

US 2019/0199136 A1    Jun. 27, 2019

(30) Foreign Application Priority Data

Dec. 27, 2017   (KR) .......................... 10-2017-0181285

(51) Int. Cl.
*H04B 7/0417* (2017.01)
*H02J 50/20* (2016.01)
*H04B 7/06* (2006.01)
*H02J 50/40* (2016.01)
*H02J 50/80* (2016.01)
*H02J 7/02* (2016.01)

(52) U.S. Cl.
CPC .............. *H02J 50/20* (2016.02); *H02J 50/40* (2016.02); *H02J 50/80* (2016.02); *H04B 7/063* (2013.01); *H04B 7/0617* (2013.01); *H04B 7/0626* (2013.01); *H02J 7/025* (2013.01)

(58) Field of Classification Search
CPC .. H02J 50/20; H02J 50/80; H02J 50/40; H02J 7/025; H04B 7/063; H04B 7/0626; H04B 7/0617
See application file for complete search history.

(56) References Cited

U.S. PATENT DOCUMENTS

| 10,236,951 | B2* | 3/2019 | Park ......................... H04B 7/04 |
| 2013/0215989 | A1* | 8/2013 | Miyatani .............. H04B 7/0617 375/267 |
| 2015/0327079 | A1* | 11/2015 | Wu ........................ H04W 16/04 455/562.1 |
| 2016/0192297 | A1* | 6/2016 | Kim ...................... H04W 52/42 455/522 |

* cited by examiner

*Primary Examiner* — Dac V Ha
(74) *Attorney, Agent, or Firm* — NSIP Law (57) ABSTRACT

A method for transmitting energy to a plurality of receiving nodes using a plurality of antennas includes: acquiring residual energy information of the receiving nodes and channel information between the antennas and the receiving nodes; determining a beamforming weight indicating a ratio between signals transmitted from the antennas and an awake ratio indicating a probability that the receiving nodes are in an active state to receive signals, based on the residual energy information and the channel information of each of the receiving nodes; generating beacon signals corresponding to the antennas based on either one or both of the beamforming weight and the awake ratio; and transmitting the beacon signals through the antennas.

13 Claims, 5 Drawing Sheets

ENERGY TRANSMITTING METHOD AND APPARATUS, ENERGY RECEIVING METHOD, AND RECEIVING NODE

CROSS-REFERENCE TO RELATED APPLICATIONS

This application claims the benefit under 35 USC 119(a) of Korean Patent Application No. 10-2017-0181285 filed on Dec. 27, 2017, in the Korean Intellectual Property Office, the entire disclosure of which is incorporated herein by reference for all purposes.

BACKGROUND

1. Field

The following description relates to a method and an apparatus for transmitting energy to a plurality of receiving terminals using a plurality of antennas.

2. Description of the Related Art

Normally, various electronic apparatuses include batteries, which may be replaced or recharged as a power source. To this end, the electronic apparatuses include contact terminals to be in contact with an external charging device. That is, the electronic apparatuses are electrically connected to the charging device via the contact terminal. However, since the contact terminal is externally exposed outside of the electronic apparatus, the contact terminal may be contaminated by foreign substances or shorted due to moisture. As a result, the contact failure between the contact terminal and the charging device may result in the battery of the electronic apparatus not being appropriately charged.

A wireless power transfer (WPT) for wirelessly charging the electronic apparatus obviates the above-mentioned problems. A wireless power transfer system is a technique of transmitting power through space without a physical power line connection, which maximizes the convenience of supplying power to mobile devices and digital home appliances.

One of the various methods of wirelessly transmitting power includes a method of using RF energy, which is capable of wirelessly charging remotely. A typical application to which RF energy transfer technique is applied is a wireless powered sensor network. In a wireless powered sensor network, the power required for the sensor node that receives power is typically very low, which makes it suitable for sufficient power to be transmitted wirelessly. However, in the sensor network, the presence of a plurality of sensor nodes may result in inefficiencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for transmitting energy to a plurality of receiving nodes using a plurality of antennas includes: acquiring residual energy information of the receiving nodes and channel information between the antennas and the receiving nodes; determining a beamforming weight indicating a ratio between signals transmitted from the antennas and an awake ratio indicating a probability that the receiving nodes are in an active state to receive signals, based on the residual energy information and the channel information of each of the receiving nodes; generating beacon signals corresponding to the antennas based on either one or both of the beamforming weight and the awake ratio; and transmitting the beacon signals through the antennas.

The antennas may include a plurality of energy transmitting antennas configured to transmit energy to the receiving nodes and a communication antenna configured to performs data communication with the receiving nodes.

The acquiring of channel information may include: transmitting a beacon packet to the receiving nodes through the communication antenna; and receiving a report packet comprising the residual energy information and the channel information from the receiving nodes, as a response for the beacon packet.

The beacon packet may include timing information on when the receiving nodes transmit the report packet.

The beacon packet may include information on the awake ratio.

The determining of the beamforming weight and the awake ratio may include: determining the beamforming weight and the awake ratio in a frame comprising a first slot for a time interval of transmitting and receiving data to and from the receiving nodes and a second time slot for another time interval of transmitting the energy to the receiving nodes.

During the transmitting of a signal, the antennas may transmit the energy to one of the receiving nodes for one frame.

During the transmitting of a signal, the antennas may simultaneously transmit the energy to the plurality of receiving nodes for one frame.

The determining of a beamforming weight may include: determining an optimal beamforming weight based on the channel information to transmit energy through a channel determined to have a least amount of energy loss.

During the determining of the beamforming weight, the second time slot may be allocated to one of the receiving nodes having a least residual energy.

The determining of the beamforming weight and the awake ratio may include: determining, among the receiving nodes, the beamforming weight and the awake ratio such that a number of receiving nodes having residual energy value greater than a threshold value is at a maximum.

During the determining of the awake ratio, the awake ratio may be determined based on either one or both of the residual energy of the receiving nodes and maximum storage energy of the receiving nodes.

In another general aspect, an energy transmitting apparatus, includes a plurality of antennas, an information acquiring unit, a determining unit, and a signal generating unit. The plurality of antennas is configured to transmit energy to a plurality of receiving nodes. The information acquiring unit is configured to acquire residual energy information of the receiving nodes and channel information between the antennas and the receiving nodes. The determining unit is configured to determine a beamforming weight indicating a ratio between signals transmitted from the antennas and an awake ratio indicating a probability that the receiving nodes are in an active state to receive signals, based on the residual energy and the channel information of the receiving nodes. The signal generating unit is configured to generate signals to be transmitted by the antennas based on either one or both of the beamforming weight and the awake ratio.

In another general aspect, an energy receiving apparatus includes an energy receiving antenna, a communication antenna, an information acquiring unit, and a generating unit. The energy receiving antenna is configured to receive energy from a plurality of energy transmitting antennas in an energy transmitting apparatus. The communication antenna is configured to communicate with the energy transmitting apparatus. The information acquiring unit is configured to acquire channel information between the energy transmitting antennas and the energy receiving antenna, based on a beacon packet received through the communication antenna. The generating unit is configured to generate a report packet comprising the channel information and the residual energy information. The report packet is transmitted through the communication antenna.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENT

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1:
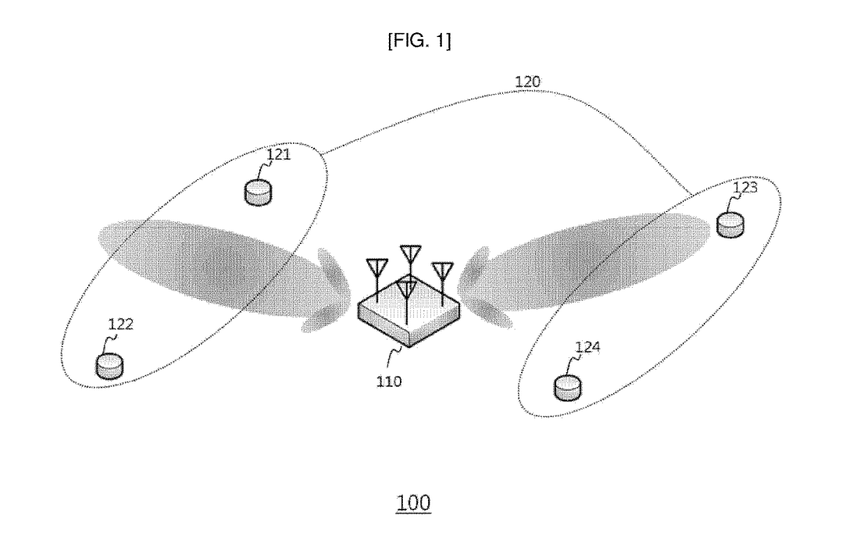
FIG. 1 is a diagram illustrating an example of an energy transfer system.

FIG. 1 is a diagram illustrating an example of an energy transfer system 100.

The energy transfer system 100 according to an example of the present disclosure includes an energy transmitting apparatus 110 and a plurality of receiving nodes 121 to 124.

The energy transmitting apparatus 110 transmits one or more RF signal type power beacons to the receiving nodes 120. In this case, the energy transmitting apparatus 110 may transmit the power beacons through a plurality of antennas. The energy transmitting apparatus 100 may transmit energy such that the energy is transmitted by concentrating on one receiving node at one point of time or the energy is transmitted to a plurality of receiving nodes. In this specification, the former is referred to as time-divisional beamforming and the latter is referred to as beam splitting beamforming.

When the power beacon is transmitted, the energy transmitting apparatus 110 determines a beamforming weight for each of the plurality of antennas. The beamforming weight is information indicating a ratio of a power beacon transmitted from each antenna and various types of beamforming weights that may be set depending examples. For example, the beamforming weight may be represented by size and phase information of a power beacon transmitted by an antenna.

The energy transmitting apparatus 110 may consider residual energy information of receiving nodes 121 to 124 and channel information to determine the beamforming weight of an antenna.

The receiving nodes 120 are nodes which receive energy from the energy transmitting apparatus 110 and may be sensors for configuring a sensor network. The receiving nodes 120 may transmit the residual energy information and the channel information to the energy transmitting apparatus 110.

Figure 2:
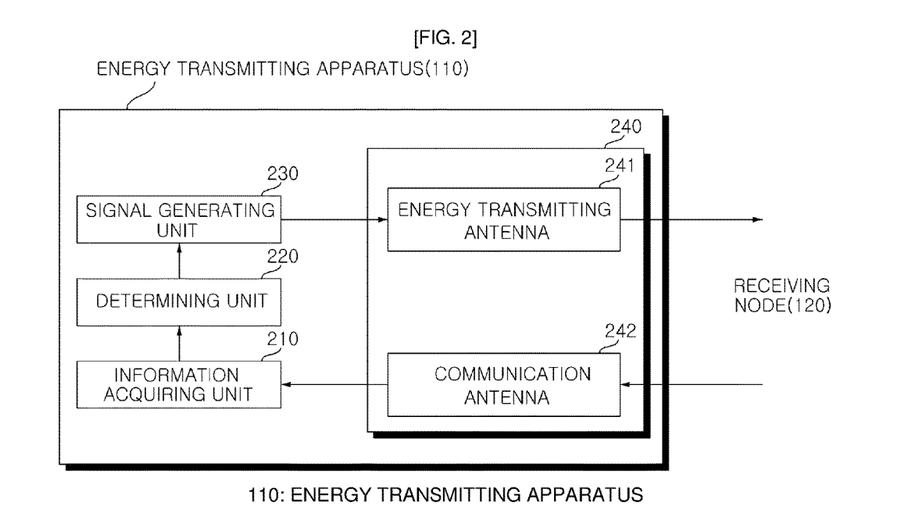
FIG. 2 is a diagram illustrating an example of an energy transmitting apparatus.

FIG. 2 is a diagram illustrating an example of an energy transmitting apparatus 110.

The energy transmitting apparatus 110 according to the example of the present disclosure may include an information acquiring unit 210, a determining unit 220, a signal generating unit 230, and a plurality of antennas 240.

The information acquiring unit 210 acquires the residual energy information and the channel information of the receiving nodes 120. In this specification, the channel information is information indicating a characteristic of a channel formed between the antennas 240 and the receiving nodes 120, and is acquired by comparing magnitudes and phases of a signal transmitted from the antenna and a signal received by the receiving nodes.

The plurality of antennas 240 to be described below may include a plurality of energy transmitting antennas 241 to transmit power and a communication antenna 242. The information acquiring unit 210 communicates with the receiving nodes 120 through the communication antenna 242 to acquire the residual energy information and the channel information of the receiving nodes 120.

In this case, the information acquiring unit 210 transmits packets (hereinafter, referred to as beacon packets) through the communication antenna 242 before transmitting a power beacon signal through the energy transmitting antenna 241. The information acquiring unit 210 receives response packets (hereinafter, referred to as report packets) and acquires the residual energy information and the channel information of the receiving nodes 120 using the information included in the report packets.

The determining unit 220 determines either one or both of the beamforming weight and an awake ratio based on the residual energy information and the channel information of the receiving nodes 120.

The receiving nodes 120 according to an example of the present disclosure may operate in any one of an active state and a sleep state. In this specification, the awake ratio represents a probability that the receiving node is in an active state for a predetermined time. The receiving nodes in the active state may operate in any one of an active mode, a transmitting mode, and a standby mode.

The determining unit 220 sets an awake ratio of a receiving node having small residual energy to be high to allow the corresponding receiving node to receive more energy.

In some cases, the determining unit 220 adjusts the beamforming weight of the antenna to transmit more energy to the corresponding receiving node or to set a time to transmit the energy to the corresponding node to be longer.

The determining unit 220 may change the beamforming weight in accordance with the beamforming manner. There may be various beamforming manners according to examples, and the beamforming manners may include 1) a time-divisional manner and 2) a beam splitting manner. Hereinafter, a process of determining a beamforming weight by the respective manners will be described.

<Time-Divisional Manner>

According to the time-divisional manner, the signals are intensively transmitted to one sensor node at predetermined time intervals. In this specification, for the convenience of description, the predetermined time interval is referred to as a frame. One frame is divided into a first slot which is a time interval when data is transmitted/received to/from the receiving nodes and a second slot which is a time interval when the signal is transmitted to the receiving nodes. In this case, the first slot may be located prior to the second slot.

When the time-divisional manner is used, a receiving node which transmits a signal is changed at every frame so that the signals are sequentially transmitted to the receiving nodes. In this case, more frames may be allocated to the receiving nodes having small residual energy so that the signal is more frequently transmitted thereto.

When the time-divisional manner is applied, the acquiring unit 210 communicates with one receiving node to estimate a channel and determines an optimal beamforming weight so that the maximum energy is transmitted to the receiving node. For example, with respect to the receiving node to which energy will be transmitted, antennas having a good channel characteristic are sequentially aligned, and then the beamforming weight is determined such that more energy is transmitted to an antenna having a good channel characteristic and less energy is transmitted to an antenna having a bad channel characteristic. In this case, within a range which does not exceed maximum transmission energy which is capable of being transmitted for one frame by the energy transmitting apparatus 110, the upper-level antennas transmit maximum energy that the antenna can transmit in the order of better channel characteristics. Further, it may be designed that at a time when energy exceeds maximum transmission energy, an antenna transmits energy so as not to exceed the maximum power energy and an antenna having a determined worst channel characteristic does not transmit energy.

For the convenience of description, it is assumed that a beamforming weight of an n-th antenna among N energy transmitting antennas is wn. A beamforming weight vector $w^k$ of antennas for a k-th receiving node among K receiving nodes and a channel vector $h_k$ indicating channel information between each antenna and the k-th receiving node are defined by the following Equation 1.

$$w^k = (w_1^k, \ldots, w_n^k)^T$$

$$h_k = (h_{k,1}, \ldots, h_{k,N})^T \qquad \text{Equation 1}$$

In this case, $h_{k,n}$ indicates a channel gain from the n-th antenna to the k-th receiving node. A target function and a condition for maximizing reception power may be determined by the following Equation 2.

Target Function: $|h_k w|^2$

Condition: $|w_n|^2 \le P_{ant}$ $$w^H w \le P_{tot} \qquad \text{Equation 2}$$

$P_{ant}$: Maximum transmission power which can be transmitted from single antenna $P_{tot}$: Maximum transmission power which can be transmitted by energy transmitting apparatus 110 at one frame It is assumed that a phase of the channel gain is $\angle h_{k,n}$, a size of the beamforming weight is $x_n$, and the phase is $w_n$. When the channel information is acquired, the phase of the beamforming weight may be optimized to have an opposite sign of a phase of the channel gain, that is, $w_n = -\angle h_{k,n}$. In this case, Equation 2 may be changed into the following Equation 3.

$$\text{Target Function: } \sum_{n=1}^{N} |h_{k,n}| x_n \qquad \text{Equation 3}$$

Condition: $x_n^2 \le P_{ant}$ $$\sum_{n=1}^{N} x_n^2 \le P_{tot}$$

xn is considered as an optimization variable and the function is optimized by a Lagrangian multiplier method. The Lagrangian multiplier method is a mathematical method which solves an optimization problem having a restriction and changes a restricted problem into a problem which does not have a restriction by adding a Lagrange multiplier term to a value to be optimized and then solves the problem. When the Lagrangian multiplier is assumed as λ, the target function of Equation 3 may be represented by the following Equation 4.

$$\sum_{n=1}^{N} |h_{k,n}| x_n + \lambda \left( P_{tot} - \sum_{n=1}^{N} x_n^2 \right) \qquad \text{Equation 4}$$

In this case, the optimization variable may be obtained by the following Equation 5.

$$x_n(\lambda) = \min\left( \frac{|h_{k,n}|}{2\lambda}, \sqrt{P_{ant}} \right) \qquad \text{Equation 5}$$

An entire power for the Lagrangian multiplier λ is defined as $$P(\lambda) = \sum_{n=1}^{N} x_n(\lambda)^2$$

and a value of λ is gradually increased within a range of $P(\lambda) \leq P_{tot}$ to calculate an optimal Lagrangian multiplier λ*.

In this case, in order to allow an antenna having a high channel gain to transmit more energy, the antennas are aligned according to the channel gain and an antenna having an i-th smaller channel gain is defined as n(i).

When $x_{n(i)}(\lambda)^2 = P_{ant}$, that is, when the power of the corresponding antenna is the maximum power, if a value of λ is defined as $\lambda_i$, Equation 5 may be changed into the following Equation 6.

$$\lambda_i = \frac{|h_{k,n(i)}|}{2\sqrt{P_{ant}}} \qquad \text{Equation 6}$$

Further, when $P(\lambda_i)$ is calculated from Equation 6, the following Equation 7 is derived.

$$P(\lambda_i) = \left( \sum_{l=1}^{i-1} \frac{|h_{k,n(l)}|^2}{|h_{k,n(i)}|^2} + N - i + 1 \right) P_{ant} \qquad \text{Equation 7}$$

Since $P(\lambda_i)$ cannot exceed a total power $P_{tot}$, a relationship of $P(\lambda_i) \leq P_{tot}$ needs to be satisfied. Referring to Equation 7, $P(\lambda_i)$ is a function that is decreased as i is increased so that the smallest i which satisfies $P(\lambda_i) \leq P_{tot}$ is searched and is defined as i*.

When λ* which is a value of λ at the time when i is i* by Karush-Kuhn-Tucker conditions is calculated, λ* is represented by the following Equation 8.

$$\lambda^* = \begin{cases} 0 & (i^* = 0) \\ \frac{1}{2}\sqrt{\frac{\sum_{i=1}^{i^*-1} |h_{k,n(l)}|^2}{P_{tot} - (N - i^* + 1)P_{ant}}} & (i^* = 2, \ldots, N+1) \end{cases} \qquad \text{Equation 8}$$

As a result, an optimal solution of the beamforming weight may be determined by the following Equation 9.

$$w_n^k = x_n(\lambda^*) \exp(-j \angle h_{k,n}) \qquad \text{Equation 9}$$

<Beam Splitting Manner>

The beam splitting manner refers to a method that the beacon signals transmitted from a plurality of antennas for one frame are simultaneously transmitted to a plurality of receiving nodes. When the beam splitting manner is applied, the residual energy level of the receiving node may be considered to determine the beamforming weight. That is, the beamforming weight may be determined such that more energy is transmitted to a receiving node having a lower residual energy level and less energy is transmitted to a receiving node which does not have a lower residual energy level.

In the beam splitting manner, a Pareto optimal point at which the reception power is maximum in an average reception power region R needs to be acquired and thus the target function is defined by the following Equation 10.

Target Function: $\alpha^T x$

Condition: $x \in \overline{R}$      Equation 10

Referring to Equation 11, the reception power weight vector is $\alpha = (\alpha_1, \ldots, \alpha_K)^T$, and x is an optimization variable. The reception power weight vector is a vector including information on the importance of the receiving node. The reception power weight vector needs to satisfy the following Equation 11.

$$\sum_{k=1}^{K} \alpha_k \leq 1, \alpha_k \geq 0 \qquad \text{Equation 11}$$

In this case, the reception power $r_k$ of a k-th receiving node is represented by the following Equation 12.

$$r_k |y_k|^2 = |h_k^T w|^2 = tr(h_k^* h_k^T w w^H) = tr(G_k S) \qquad \text{Equation 12}$$

Referring to Equation 12, in order to briefly summarize the equation, it is defined that $G_k = h_k^* h_k^T$, $S = ww^H$ and Bn is defined as N*N matrix in which an element of (n,n) is 1 and the remaining elements are 0. In this case, a function to be optimized may be defined by the following Equation 13.

$$\text{Function: } \sum_{k=1}^{K} \alpha_k rr(G_k S) \qquad \text{Equation 13}$$

Condition: $tr(B_n S) \leq P_{ant}(n = 1, \ldots, N)$ $tr(S) \leq P_{tot}$ $S \geq 0$ $\text{rank}(S) = 1$ Referring to Equation 13, S is an optimization variable. When it is assumed that $S(\alpha) = w(\alpha)w(\alpha)^H$ is an optimal solution, an optimal reception power of a k-th receiving node is defined as $r_k(\alpha) = |h_{k,n} w(\alpha)|^2$ and an optimal reception power vector is defined as $r(\alpha) = (r_1(\alpha), \ldots, r_K(\alpha))^T$. In Equation 13, when it is defined that $$V(\alpha) = \sum_{k=1}^{K} \alpha_k G_k,$$

the optimization function of Equation 14 is defined as $tr(V(\alpha)S)$. When Eigen decomposition is used, it is decomposed to be $V(\alpha) \Longrightarrow U(\alpha)^H Z(\alpha) U(\alpha)$. When a diagonal matrix $Z(\alpha)=\text{diag}(z_1(\alpha), \ldots, z_N(\alpha))^T$ is aligned in descending order, $z1(\alpha)$ corresponds to a principal eigenvalue of $V(\alpha)$, and $u1(\alpha)$ is a principal eigenvector. Therefore, the optimal beamforming weight vector is represented by the following Equation 14.

$$w(\alpha) = \sqrt{P_{tot}} u_1^*(\alpha) \quad \text{Equation 14}$$

When the optimization function of Equation 14 is rewritten using the eigenvalue and the eigenvector of $V(\alpha)$, the following Equation 15 is obtained.

$$\sum_{n=1}^{N} z_n(\alpha) |u_n(\alpha)^T w|^2 \quad \text{Equation 15}$$

Referring to Equation 15, a target function to be optimized may be redefined as represented by the following Equation 16.

Target Function: $|u_1(\alpha)^T w|^2$

Condition: $|w_n|^2 \le P_{ant}$ $$w^H w \le P_{tot} \quad \text{Equation 16}$$

Referring to Equation 16, it is understood that Equation 16 is the same as Equation 2 except that hk vector is changed into $u1(\alpha)T$. Therefore, the beamforming weight optimized by the same manner as described above is calculated.

<Process of Calculating Awake Ratio>

For the convenience of description, it is assumed that residual energy of a receiving node at a t-th frame is $E(t)$, transmitted energy is $\Delta+(r(t))$, and consumed energy is $\Delta-(r(t))$.

The residual energy of the receiving node at a t+1-th frame may be represented by the following Equation 17.

$$E(t30\ 1) = \min(E(t)+\Delta^+(r(t))-\Delta^-(a(t),r(t)), E_{max}) \quad \text{Equation 17}$$

Referring to Equation 17, since the residual energy of the receiving node cannot exceed the maximum energy Emax, the residual energy is calculated as the smaller of (residual energy+transmitted energy−consumed energy) and maximum energy.

The energy consumed at the receiving node varies depending on whether the receiving node is in an active state or in a sleep state. It is assumed that the energy consumed in an awake state is $\Delta-(1,E)$ and energy consumed in a sleep state is $\Delta-(0,E)$. An expected value of the residual energy according to an awake ratio σ may be changed by the following Equation 18.

$$SE(t) = \Delta^+(r(t)) - (\Delta^-(1,E) - \Delta^-(0,E)) \times \sigma - \Delta^-(0,E) \quad \text{Equation 18}$$

Therefore, when the expected value of the residual energy is set to always maintain a positive value by adjusting an awake ratio, the receiving node may be allowed to operate continuously without ending with an energy shortage. Therefore, the determining unit 220 determines the beamforming weight and the awake ratio such that the residual energy of the receiving node is always maintained to be positive and a sum of the energy received in the receiving node is maximized.

Since energy received in the receiving node is increased as the awake ratio is increased, a sum of the received energy of each sensor node is an increasing function with respect to the awake ratio. A function for an awake ratio σ is set by the following Equation 20 using a log utility function in accordance with this relationship.

$$\mu(\sigma) = \frac{\sigma^\Psi - 1}{\Psi} \quad \text{Equation 19}$$

When it is assumed that an awake ratio of a k-th sensor node among K sensor nodes is σk, it is desirable to set an awake ratio at which the sum of the log utility function in each sensor is maximized. Therefore, an awake ratio which makes a target function of Equation 20 maximum is found.

Target Function: $\sum_{k=1}^{K} \mu(\sigma_k) \quad \text{Equation 20}$

Condition: $SB(t) \ge 0,\ 0 \le \sigma_k \le 1,\ r \in \overline{R}$

Referring to Equation 20, r is a reception power, and R is a reception power region. The target function of Equation 21 may be optimized using the Lyapunov optimization problem. The Lyapunov function $L(t)$ is defined by the following Equation 21.

$$L(t) = \frac{1}{2} \sum_{k=1}^{K} (E_{max} - E_k(t))^2 \quad \text{Equation 21}$$

In Equation 21, $E_{max} - E_k(t)$ is a shortage of a storage energy of the k-th receiving node. When it is defined that $D(t) = L(t+1) - L(t)$, in order to maximize the log utility function, $$D(t) - \lambda \sum_{k=1}^{K} \mu(\sigma_k(t))$$

needs to be minimized, which is expanded as represented in the following Equation 22.

$$D(t) - \lambda \sum_{k=1}^{K} \mu(\sigma_k(t)) \le -\eta T_{es} \sum_{k=1}^{K} (E_{max} - E_k(t)) r_k(t) - \\ \lambda \sum_{k=1}^{K} \left\{ \mu(\sigma_k(t)) - \frac{\kappa E_k(t)}{\lambda}(E_{max} - E_k(t))\sigma_k(t) \right\} + \\ \sum_{k=1}^{K} (E_{max} - E_k(t))\phi(E_k(t)) + Y \quad \text{Equation 22}$$

In order to minimize a left term of Equation 22, the target function needs to be maximized by the following Equation 23.

Target Function: $\mu(\sigma) - \left(\kappa \frac{E_k(t)}{\lambda}\right)(E_{max} - E_k(t))\sigma \quad \text{Equation 23}$ Condition: $0 \le \sigma \le 1$ Since the awake ratio σ cannot exceed 1, the awake ratio is determined by the following Equation 24.

$$\tilde{\sigma}_k(t) = \min\left\{\left(\left(\kappa \frac{E_k(t)}{\lambda}\right)(E_{max} - E_k(t))\right)^{\frac{1}{\Psi-1}}, 1\right\} \quad \text{Equation 24}$$

Referring to Equation 24, it is understood that the awake ratio is determined based on the residual energy of the receiving node and the maximum energy of the receiving node.

The signal generating unit 230 generates a signal which will be transmitted by the energy transmitting antennas 241 based on either one or both of the beamforming weight and the awake ratio. Hereinafter, an example of a structure of the signal generating unit 230 will be described with reference to FIG. 3.

Figure 3:
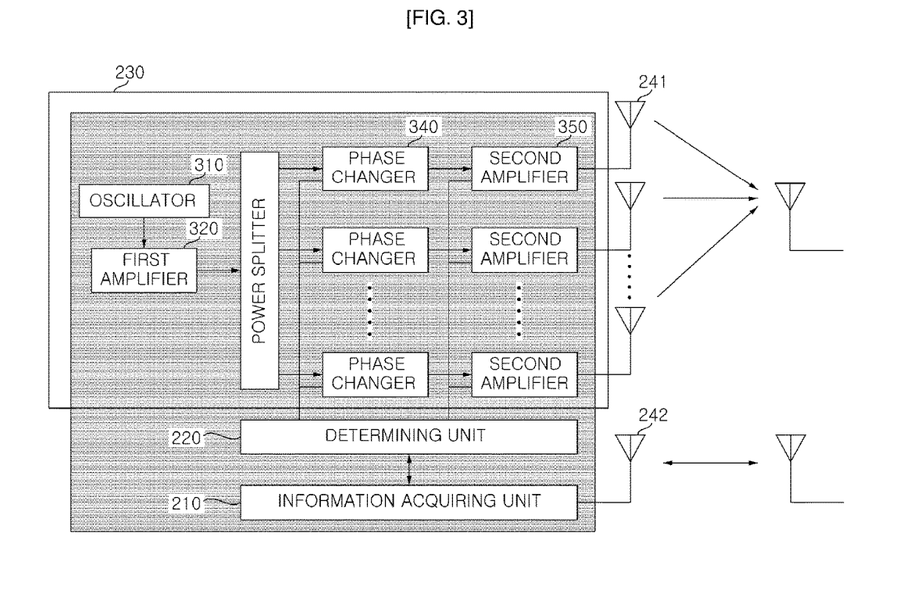
FIG. 3 is a diagram illustrating an example of a signal generating unit.

FIG. 3 is a diagram illustrating an example of a signal generating unit 230.

The signal generating unit 230 according to an example of the present disclosure includes an oscillator 310, a first amplifier 320, a power splitter 330, a phase changer 340, and a second amplifier 350.

The oscillator 310 generates an oscillating signal with a specific frequency.

The first amplifier 320 is also referred to as a drive amplifier and amplifies the oscillating signal.

The power splitter 330 splits the amplified signal to paths corresponding to the energy transmitting antennas 241.

The phase changer 340 changes a phase of a signal based on the beamforming weight.

The second amplifier 350 adjusts a magnitude of a signal based on the beamforming weight.

Referring to FIG. 2 again, the antenna unit 240 includes a plurality of energy transmitting antennas 241 to transmit energy and a communicating antenna to perform data communication with the receiving node 120.

The energy transmitting antennas 241 transmit the signal generated in the signal generating unit 230. In this case, the signal to be transmitted may be an RF signal and may be referred to as a power beacon signal.

Figure 4:
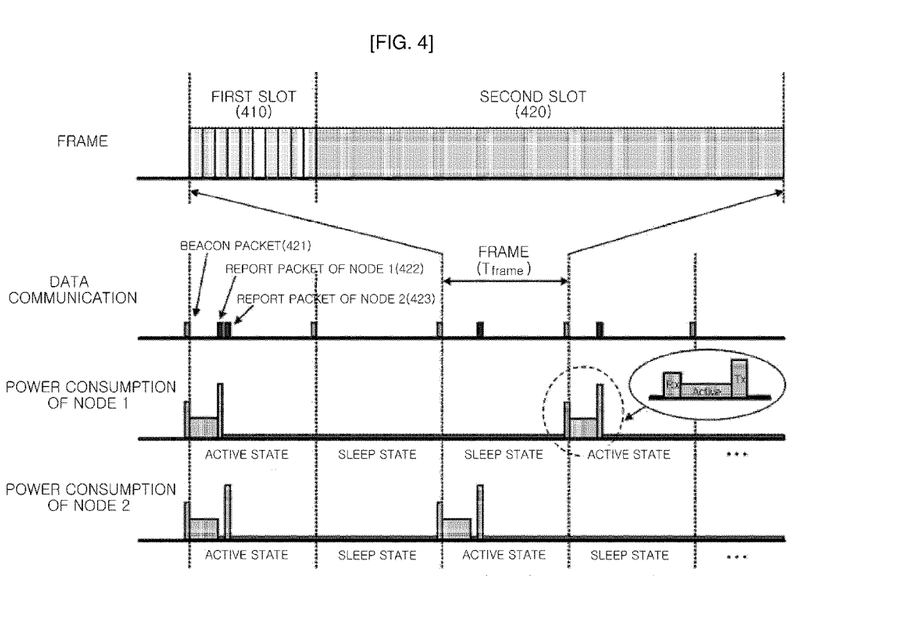
FIG. 4 is a diagram illustrating an example of an operation between an energy transmitting apparatus and a receiving node over time.

FIG. 4 is a diagram illustrating an example of an operation between an energy transmitting apparatus 110 and a receiving node 120 over time.

Referring to FIG. 4, the time which is referred to as a frame is divided into a first time slot 410 and a second time slot 420. The first time slot 410 may be configured to include a plurality of sub slots, and communicate with a specific receiving node so that collision may be prevented.

First, the energy transmitting apparatus 110 transmits a beacon packet 421 when the frame starts. The beacon packet 421 may include information on an awake ratio for all receiving nodes. There may be various methods for representing an awake ratio σ(t) depending on exemplary embodiments. For example, if a(t)=1 when the receiving node is in an active state at a t-th frame, and a(t)=0 when the receiving node is in a sleep state, the awake ratio σ(t) may represent a probability that the state of the receiving node is "1".

When the energy transmitting apparatus 110 transmits a beacon packet, all receiving nodes in the active state receive the beacon packet and switch an operation mode into a receiving mode.

When the beacon packet is received, all receiving nodes in the active state change the operation mode into an active mode. The receiving nodes acquire channel information while operating in an active mode. For example, in order to estimate a state of the channel, the receiving node receives power transmitted through the first slot 410. Further, the receiving nodes detect or calculate their respective residual energy. The receiving node generates a report packet including a measured value of energy received for the first slot 410, the residual energy of the receiving node, and other detecting results.

When the active mode ends, the receiving node changes its operation mode into a transmitting mode. In the transmitting mode, the receiving nodes transmit the report packet to the energy transmitting apparatus 110. In this case, the transmission interval may be adjusted to prevent the collision between the receiving nodes. For example, a first receiving node transmits the report packet at a fifth sub-slot of the first slot 410 and a second receiving node transmits the report packet at a sixth sub-slot of the first slot 410. In this case, the time when the receiving node transmits the report packet is included in the beacon packet or may be determined by a predetermined rule between the receiving nodes.

When the transmitting mode ends, the receiving node changes its operation mode into a standby mode. Thereafter, the receiving node charges the energy by receiving the power beacon signal received for a second slot 420.

As described above, when the energy transmitting apparatus 110 transmits the power beacon signal for the second slot 420, the energy transmitting apparatus 110 determines the beamforming weight and the awake ratio based on the channel information and the residual energy information of the receiving node included in the report packet, and transmits an optimal power beacon signal to the receiving node which is in an active mode.

Figure 5:
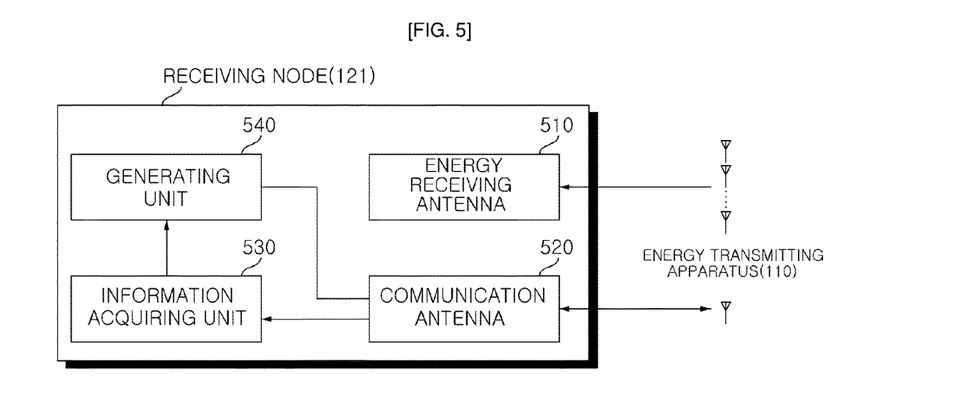
FIG. 5 is a diagram illustrating an example of a receiving node.

FIG. 5 is a diagram illustrating an example of a receiving node 121. The receiving node 121 according to an example of the present disclosure includes an energy receiving antenna 510, a communication antenna 520, an information acquiring unit 530, and a generating unit 540.

The energy receiving antenna 510 receives a signal from the plurality of energy transmitting antennas 241. The signal received through the energy receiving antenna 510 may be stored in the battery through either one or both of a rectifier and an amplifier.

The communication antenna 520 communicates with the communication antenna 242 of the energy transmitting apparatus 110. As described above, the communication antenna 520 may receive a beacon packet from the communication antenna 242 at a frame starting timing.

The information acquiring unit 530 acquires the residual energy of the receiving node 121 and the channel information between the energy transmitting antennas 241 and the energy receiving antenna 510, based on the beacon packet received by the communication antenna 520. The information acquiring unit 530 checks an energy level of a battery (not illustrated) to check the residual energy of the receiving node 121 and checks the magnitude and the phase of the signal received through the beacon packet to acquire the channel information.

The generating unit 540 generates a report packet including the channel information and the residual energy information.

The generated report packet is transmitted to the energy transmitting apparatus 110 through the communication antenna 520 at a transmission timing included in the beacon packet or a predetermined transmission timing.

Figure 6:
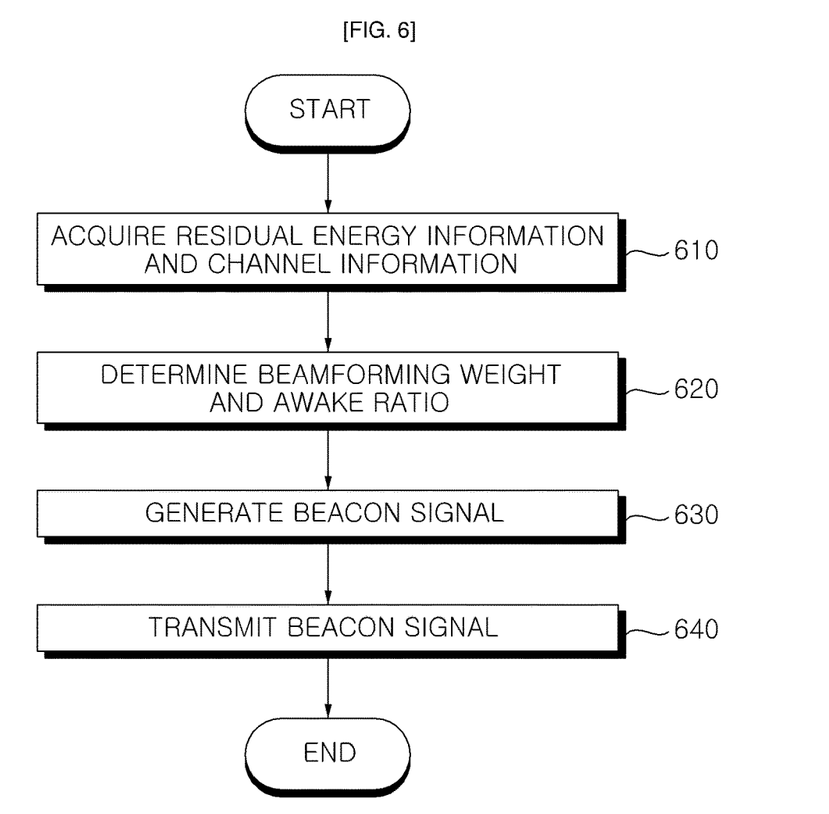
FIG. 6 is a flowchart illustrating an example of an energy transmitting method.

FIG. 6 is a flowchart illustrating an example of an energy transmitting method. An energy-transmitting method according to an example of the present disclosure may be a method for transmitting energy to a plurality of terminals using a plurality of energy transmitting antennas.

In step 610, residual energy information of a receiving node and channel information between the energy transmitting antenna and the receiving node are acquired. The residual energy information of the receiving node and the channel information may be acquired through a report packet received from the receiving nodes 120 in accordance with a beacon packet transmitted by the energy transmitting apparatus 110.

In step 620, a beamforming weight for the energy transmitting antenna and an awake ratio of the receiving node are determined. As described above, the beamforming weight refers to a ratio between beacon signals transmitted from the energy transmitting antennas 241 and the awake ratio refers to a probability that the receiving nodes 120 are activated at a specific frame. The beamforming weight and the awake ratio may be determined based on the residual energy information and the channel information.

In step 630, a beacon signal corresponding to the energy transmitting antenna is generated based on either one or both of the beamforming weight and the awake ratio.

In step 640, the beacon signal is transmitted through the plurality of energy transmitting antennas.

Figure 7:
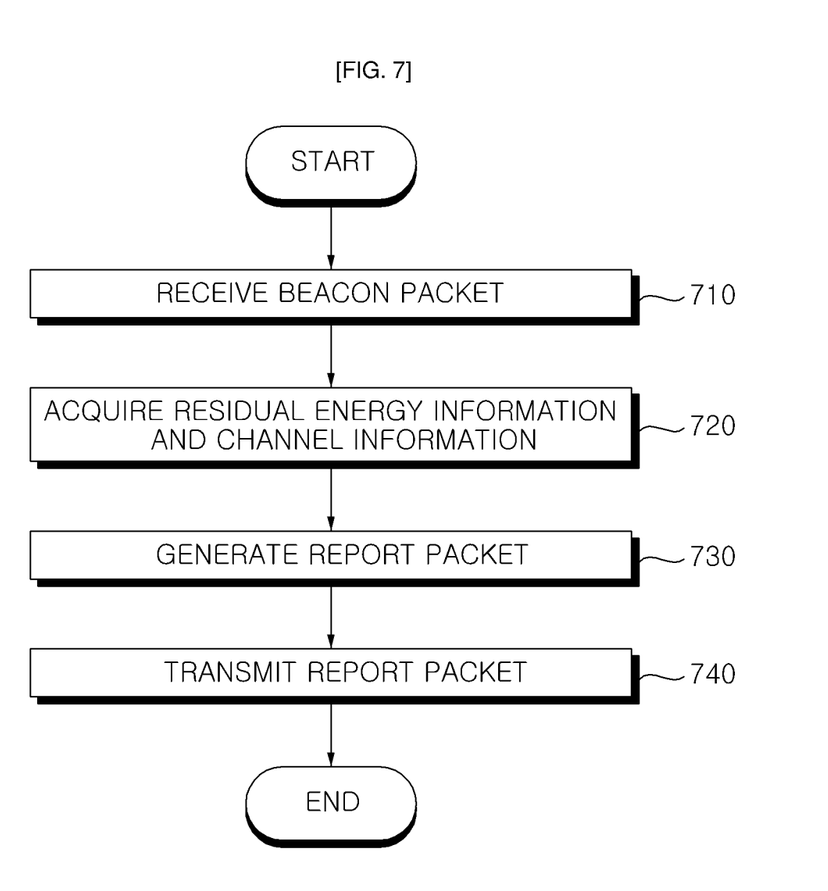
FIG. 7 is a flowchart illustrating an example of an energy receiving method.

FIG. 7 is a flowchart illustrating an example of an energy receiving method. An energy receiving method according to an example of the present disclosure may be a method for receiving energy from a plurality of energy transmitting antennas in the receiving node 121.

In step 710, the beacon packet is received from the energy transmitting apparatus 110. In this case, the operation mode of the receiving node 121 may be set to be a receiving mode.

In step 720, the channel information with the energy transmitting apparatus 110 is acquired based on the beacon packet. Further, the residual energy information of the receiving node 121 is acquired. In this case, the operation mode of the receiving node 121 may be set to be an active mode.

In step 730, a report packet including the channel information and the residual energy information is generated. The report packet may further include maximum stored energy of the receiving node 121.

In step 740, the report packet is transmitted. In this case, the operation mode of the receiving node 121 may be set to be a transmitting mode.

The signal generating unit 230, determining unit 220, information acquiring unit 210 and information acquiring unit 530 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for transmitting energy to a plurality of receiving nodes using a plurality of antennas, comprising:
   acquiring residual energy information of the receiving nodes and channel information between the antennas and the receiving nodes;
   determining a beamforming weight indicating a ratio between signals transmitted from the antennas and an awake ratio indicating a probability that the receiving nodes are in an active state to receive signals, based on the residual energy information and the channel information of each of the receiving nodes;
   generating beacon signals corresponding to the antennas based on either one or both of the beamforming weight and the awake ratio; and
   transmitting the beacon signals through the antennas.

2. The energy transmitting method according to claim 1, wherein the antennas comprise a plurality of energy transmitting antennas configured to transmit energy to the receiving nodes and a communication antenna configured to performs data communication with the receiving nodes.

3. The energy transmitting method according to claim 2, wherein the acquiring of channel information comprises:
   transmitting a beacon packet to the receiving nodes through the communication antenna; and
   receiving a report packet comprising the residual energy information and the channel information from the receiving nodes, as a response for the beacon packet.

4. The energy transmitting method according to claim 3, wherein the beacon packet comprises timing information on when the receiving nodes transmit the report packet.

5. The energy transmitting method according to claim 3, wherein the beacon packet comprises information on the awake ratio.

6. The energy transmitting method according to claim 2, wherein the determining of the beamforming weight and the awake ratio comprises:
   determining the beamforming weight and the awake ratio in a frame comprising a first slot for a time interval of transmitting and receiving data to and from the receiving nodes and a second time slot for another time interval of transmitting the energy to the receiving nodes.

7. The energy transmitting method according to claim 6, wherein during the transmitting of a signal, the antennas transmit the energy to one of the receiving nodes for one frame.

8. The energy transmitting method according to claim 6, wherein during the transmitting of a signal, the antennas simultaneously transmit the energy to the plurality of receiving nodes for one frame.

9. The energy transmitting method according to claim 6, wherein during the determining of the beamforming weight, the second time slot is allocated to one of the receiving nodes having a least residual energy.

10. The energy transmitting method according to claim 1, wherein the determining of a beamforming weight comprises:
    determining an optimal beamforming weight based on the channel information to transmit energy through a channel determined to have a least amount of energy loss.

11. The energy transmitting method according to claim 1, wherein the determining of the beamforming weight and the awake ratio comprises:
    determining, among the receiving nodes, the beamforming weight and the awake ratio such that a number of receiving nodes having residual energy value greater than a threshold value is at a maximum.

12. The energy transmitting method according to claim 1, wherein during the determining of the awake ratio, the awake ratio is determined based on either one or both of the residual energy of the receiving nodes and maximum storage energy of the receiving nodes.

13. An energy transmitting apparatus, comprising:
    a plurality of antennas configured to transmit energy to a plurality of receiving nodes;
    an information acquiring unit configured to acquire residual energy information of the receiving nodes and channel information between the antennas and the receiving nodes;
    a determining unit configured to determine a beamforming weight indicating a ratio between signals transmitted from the antennas and an awake ratio indicating a probability that the receiving nodes are in an active state to receive signals, based on the residual energy and the channel information of the receiving nodes; and a signal generating unit configured to generate signals to be transmitted by the antennas based on either one or both of the beamforming weight and the awake ratio.

* * * * *